3,398,130
CATALYST AND PROCESS FOR
POLYMERIZATION
John Boor, Jr., El Cerrito, Calif., assignor to Shell Oil
Company, New York, N.Y., a corporation of Delaware
No Drawing. Filed Sept. 17, 1962, Ser. No. 224,230
15 Claims. (Cl. 260—93.7)

This invention relates to a new and improved method for the polymerization of alpha-olefins. More particularly, it relates to a novel catalyst combination for producing solid polyolefins, such as polypropylene.

It is now well known that solid, linear polymers of alpha-olefins may be catalytically prepared at low temperatures and pressures. Such processes are conducted at temperatures ranging from about room temperature to about 150° C. and pressures beow about 500 pounds per square inch. Broadly, suitable catalysts are formed from a transition metal compound and a metal organic compound capable of acting as a reducing agent.

The activity of these catalysts varies with the selection of proportions and combinations of compounds. The specific results of variations in catalyst composition are often unpredictable since relatively small changes can lead to widely different results in reaction rates and types of products.

Solid alpha-olefin polymers produced according to known methods with low pressure polymerization catalysts are characterized by a high degree of linearity and significant crystallizability of the polymer. A particularly useful olefin polymer is polypropylene. Although the catalysts of this invention can be utilized in producing various other polyolefins, the invention is of particular advantage in the production of polypropylene, and the discussion therefore will be mainly in terms of propylene polymerization.

A variety of results can be obtained in the low pressure polymerization of alpha-olefins with catalysts comprising a transition metal compound and a reducing agent, depending on the choice of the compound used as reducing agent, the choice of transition metal compound, and the choice of catalyst component ratios and reaction conditions. The reducing agents which are most widely used, particularly in stereoregular polymerization of propylene and higher alpha-olefins, are aluminum alkyl compounds, including aluminum trialkyls and aluminum alkyl halides.

Aluminum alkyl dihalides typically act quite differently in stereospecific catalyst compositions than aluminum trialkyls, aluminum dialkyl monohalides, and aluminum alkyl sesquihalides. It has been reported, for example, that a catalyst consisting merely of titanium trichloride and alkyl aluminum dichloride or dibromide does not permit the substantial conversion of propylene to high molecular weight solid crystalline polymer. In U.S. 2,967,-206 to Stuart et al. it is shown that such catalysts lead to the production of liquid polypropylene at conditions at which use of aluminum dialkyl monochloride instead of aluminum alkyl dichloride leads to the production of crystalline solid polypropylene.

Coordination catalysts in which the reducing agent is aluminum ethyl dichloride can be made to catalyze the production of highly crystalline polypropylene when the catalyst composition is modified by the presence of certain selected compounds. Compounds which have been reported to be effective modifiers are compounds having the formulas:

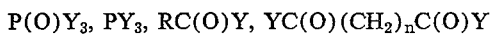

and R′$_3$Z wherein each Y is an alkylamino or alkoxy radical; Z is nitrogen, phosphorus, arsenic or antimony; R is an alkyl radical; R′ is a hydrogen, alkyl, aryl or aralkyl radical; and $n$ is an integer from 1 to 4. Other compounds reported as effective are tertiary amines, pyridine and quaternary ammonium solts.

It has now been found that an entirely different type of compound, namely acetylacetonates of transition metals are also effective in promoting the conversion of olefins to crystalline solid polymer when added to the above described catalyst system.

It is an object of this invention to provide improved processes for the polymerization of alpha-monoolefins, and particularly propylene, to high molecular weight, highly crystalline polymers. A specific object of the invention is to provide an improved combination of catalytic ingredients to catalyze such polymerizations. Other objects will appear from the following description of this invention.

According to this invention alpha-olefins are polymerized to solid, linear polymers by contact with a catalyst formed by admixing (1) an aluminum hydrocarbyl dihalide having the formula RAlX$_2$ wherein R is a hydrocarbon radical containing 1 to 12 carbon atoms and selected from the group consisting of alkyl, aryl and aralkyl and X is a halide, (2) a compound of a transition metal selected from the group consisting of titanium, zirconium, vanadium, chromium, and molybdenum, said compound being selected from the group consisting of halides and alkoxyhalides, and (3) an acetylacetonate of a transition metal.

The aluminum dihalides useful in this invention, when used either singly or in admixture with only a transition metal halide or alkoxyhalide, are ineffective as catalysts for the production of high molecular weight alpha-olefin polymers of high crystallinity. The transition metal acetylacetonates, alone or admixed with aluminum alkyl dihalides, are also not effective catalysts of alpha-olefin polymerization.

The use of the highly stereospecific catalysts of this invention results in linear polymers of alpha-monoolefins of two or more carbon atoms. In general, suitable monomers for the production of linear polyolefins are compounds having the formula RCH=CH$_2$ wherein R is hydrogen or an aliphatic, cycloaliphatic or aromatic radical containing from 1 to 20 carbon atoms. Monomers in which R is an unbranched C$_4$ or higher alkyl group generally result in polymers that are not crystallizable. Particularly suitable olefins for the production of crystallizable polymers are propylene, 1-butene, 3-methyl-1-butene, 4-methyl-1-pentene, 4-methyl-1-hexene and the like, which are known to produce stereoregular crystalline polymers. Other monomers which can be polymerized with such catalysts include styrene, allylbenzene, 4-phenyl-1-butene, 1-allyl-naphthalene, 2-allyl-toluene, vinyl cyclohexane, vinyl cyclohexene, 1-alkenes of 5 and more carbon atoms, and cyclohexyl and aryl substituted 1-alkenes. The catalysts may be used for the polymerization of mixtures of monomers when a crystalline product is possible and is desired.

One essential component of the catalyst compositions of this invention is a halide or alkoxyhalide of a transition metal selected from the group consisting of titanium, zirconium, vanadium, chromium, and molybdenum. In the active catalyst the transition metal is at a valance below its maximum. Among the halogens the order of preference runs from chlorides to bromides to iodides to fluorides.

Titanium trichloride is particularly preferred and especially the gamma form thereof. An active form of titanium trichloride is prepared, for example, by reducing titanium tetrachloride by reaction with an aluminum trialkyl, as described in U.S. 2,971,925 to Winkler et al. Activated forms of alpha and gamma titanium trichloride are sometimes referred to as delta titanium trichloride. The delta form, as well as the beta form of titanium trichloride are also suitable for use in the catalysts of this invention.

Other suitable titanium compounds include butoxy titanium dichloride and ethoxy titanium dichloride.

Similar compounds of zirconium, vanadium, chromium and molybdenum can be used, such as their trichlorides, tribromides, and alkoxy dichlorides.

The reducing component of the catalyst is an aluminum alkyl dihalide of the formula $RAlX_2$ wherein R is a hydrocarbon radical containing 1 to 12 carbon atoms, selected from the group consisting of alkyl, aryl, and aralkyl. Suitable hydrocarbon radicals include methyl, ethyl, propyl, butyl, phenyl, tolyl, phenylethyl, naphthyl and the like. The preferred halogens are chlorine and bromine. The preferred alkyl aluminum dihalides are the lower alkyl derivatives, i.e., those in which alkyl group has 1 to 4 carbon atoms. The most preferred is ethyl aluminum dichloride.

The third component of the catalyst composition is an acetylacetonate of a transition metal from the (B) subgroups of Groups IV, V, VI and in Group VIII of the Periodic Table, as illustrated on pages 444–449 of "Handbook of Chemistry and Physics," The Chemical Rubber Publishing Co., 43rd edition, 1961. The transition metals of interest are in the periods having atomic numbers 22–28, 40–46 and 72–78. Preferred acetylacetonates are those of Period IV, particularly those of titanium, chromium, manganese and iron. Chlorine substituted acetylacetonates, such as zirconium chloroacetyl acetonate $$(C_2H_7O_2)_3ZrCl$$

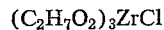

may also be used. Acetylacetonates of metals are well known metal-organic compounds; they have the general formula $M[CH_3C(O)CH_2C(O)CH_2]_m$ where $m$ equals the valance of the metal M.

The catalysts of this invention may be prepared by combining the ingredients in any desired order and contacting the combined ingredients with the monomer to be polymerized. In a batch or semibatch method, the catalyst ingredients are placed into a suitable hydrocarbon diluent in the reactor and monomer feed is then introduced. Additional catalyst components may be added during the course of the reaction. In continuous processes catalyst ingredients may be fed separately or in combination to the reactor as required during the course of the process.

Polymerization of alpha-monoolefins according to this invention and recovery of polymer are suitably carried out according to methods known to be suitable for low pressure olefin polymerization processes of the prior art. This includes batchwise, semibatchwise or continuous operations under conditions that exclude air and other atmospheric impurities, particularly moisture.

The reaction temperature is maintained between 0° and 150° C. and preferably between about 40° and about 80° C. The pressure is not critical. It is usually only sufficient to maintain liquid phase reaction conditions; it may be autogenic pressure, which will vary depending upon the components of the reaction mixture and the temperature, or it may be higher, e.g., up to 1000 p.s.i. High pressures are suitably obtained by pressuring with monomer gas or with an inert gas.

In batch operations the polymerization time can be varied as desired; it may vary, for example, from a few minutes to several hours. Polymerization in batch processes may be terminated when monomer is no longer absorbed or earlier, if desired, e.g., if the reaction mixture becomes too viscous. In continuous operations the polymerization mixture passes through a reactor of any suitable design. The polymerization reactions in such cases are suitably adjusted by varying the residence time. Residence times vary with the type of reactor system and range, for example, from 10 or 15 minutes to 1 or 2 hours.

In a suitable continuous operation, fresh feed, diluent and catalyst are continuously introduced into an agitated reaction zone, and reaction mixture slurry is withdrawn from the zone for removal and recovery of polymer. Heat of reaction may be withdrawn by indirect heat exchange or by evaporation of diluent and/or monomer in the reaction zone.

After the polymerization is complete, polymer is recovered from a slurry of the solid polymer in reaction diluent. A simple filtration is adequate to separate polymer from diluent. Other means for separating polymer from diluent may be employed. The polymer may be treated, separately or while slurried in the reaction mixture, in order to separate catalyst residues. Such treatment may be with alcohols such as methanol, acidified methanol, aqueous methanol, ethanol, isopropanol, and other similar polar liquids.

Catalyst may be used in a concentration ranging from about 0.1 to about 2% by weight based on the weight of the reaction mixture. The concentration of monomer in the reaction mixture may vary upward from 5 percent by weight of the reaction mixture, depending on the conditions employed; the range from 20 to 80 percent by weight is preferred.

The preferred molar ratios of aluminum compound to transition metal halide or alkoxyhalide are in the range from 1:0.5 to 1:2. The amount of the metal acetylacetonate is chosen in relation to the amount of aluminum compound present. The molar ratio of metal acetylacetonate to aluminum compound is below 1:1, and may be as low as 0.1:1. The preferred ratios are within the range of 0.4:1 to 0.8:1.

It is preferred to carry out the reaction according to this invention in a suitable diluent which is liquid under the conditions of reaction and relatively inert. The diluent may have the same number of carbon atoms per molecule as the olefin reactant or it may be in a different boiling range. Preferred as diluents are alkane and cycloalkane hydrocarbons. Suitable diluents are, for example, propane, butane, isobutane, cyclohexane, methylcyclohexane, tetralin, Decalin, or saturated hydrocarbon mixtures in the gasoline boiling range or Diesel oil boiling range. Aromatic hydrocarbons such as benzene, toluene, isopropylbenzene, xylene, or the like, or halogenated aromatic compounds such as chlorobenzene, or orthodichlorobenzene and the like may also be employed, if desired.

Although it is possible to use technical grades of olefins and diluents, containing the normal impurities present in such grades, it is much preferred to use purified olefin feed and purified diluents which are relatively free of impurities. Processes for purifying olefin reactants and diluents for low pressure polymerization processes are now well known to the art and are equally suitable for preparing feeds and diluents for use in processes of this invention.

In the examples and tables that follow, the intrinsic viscosity (I.V.) of polymers is determined from measurements of their specific viscosity in Decalin at 150° C. The "insolubles" content is determined by the Soxhlet extraction of polymer in isooctane at its boiling point for 24 hours, using an extraction cycle of approximately 4 minutes. Parts and percentages in the examples are by weight unless otherwise stated.

Example 1

An active form of gamma titanium trichloride, for use in various polymerization experiments, is prepared by agitating a mixture of one mole of aluminum triethyl (AlEt₃) and 3 moles of titanium tetrachloride in isopentane for one-half hour at 165° C.

A small glass pressure vessel is carefully dried and purged with dry nitrogen. To the vessel there are added, in the absence of contact with air, 5 ml. of purified heptane, 3.0 mmole (millimole) of aluminum ethyl dichloride (AlEtCl₂) and 0.65 mmole of manganese acetylacetonate. The vessel is heated to 50° C. for ¼ to ½ hour. Thereafter the vessel is cooled and 145 ml. of purified heptane, 1.1 mmole of TiCl₃ prepared as above, and about 20 g. of propylene, weighed exactly, are introduced into the vessel. The vessel is then sealed, brought to the desired reaction temperature of 50° C. in a constant temperature bath, and maintained under agitation for 20 hours. Twenty-one percent of the propylene is converted to solid polymer. Solid polymer is removed from the vessel and washed thoroughly with isopropyl alcohol. The polymer is inhibited against oxidative degradation by adding 0.2 by wt. of a good phenolic polyolefin antioxidant and is then dried in a vacuum oven at 50°–60° C. for at least 20 hours. The polymer product has a high crystallinity, as indicated by the fact that 92% by wt. is insoluble in boiling heptane. Its intrinsic viscosity is 7.1 dl./g.

Example 2

Example 1 is repeated, substituting 0.3 mmole of titanium acetylacetonate for the manganese acetylacetonate. Propylene conversion is 13% and the product is similar to that of Example 1.

Example 3

Example 1 is repeated, substituting 0.65 mmole of chromium acetylacetonate for the manganese acetylacetonate. The resulting propylene conversion is 14% and the product has an insolubility of 91%.

Example 4

When the reaction of Example 1 is carried out with a catalyst containing only gamma titanium trichloride and aluminum ethyl dichloride, only 3% of the propylene is converted to solid polypropylene.

Example 5

1-butene is charged in Example 4 in place of propylene. Less than 2% conversion of 1-butene to poly-1-butene results.

Examples 6–9

1-butene is charged in polymerization reactions carried out similarly to those of Example 1. The amount and type of acetylacetonate employed and 1-butene conversions are listed in the following table.

| Example | Acetylacetonate | | Percent Conversion |
|---|---|---|---|
| | Metal | Amount, mmole | |
| 6 | Titanium | 0.70 | 12 |
| 7 | Manganese | 0.65 | 17 |
| 8 | Chromium | 0.95 | 50 |
| 9 | Iron | 0.66 | 17 |

Example 10

In Examples 1–3, aluminum phenyl dichloride is substituted for aluminum ethyl dichloride. Similar conversions to polypropylene of similar crystallinity result.

Example 11

In Examples 1–3 and 10, vanadium trichloride is substituted for titanium trichloride. Polypropylene of similar properties is produced. Similar results are also obtained with trichlorides of zirconium, molybdenum and chromium.

Example 12

In Examples 1–3 and 10, titanium ethoxy dichloride is substituted for titanium trichloride. Polypropylene of similar properties is produced.

The catalyst systems of Examples 1–3 and 6–12 also permit the polymerization of ethylene, 4-methyl-1-pentene, 4-methyl-1-hexene, and the like to crystallizable polymers.

Solid polypropylenes of highly regular structure, such as isotactic and syndiotactic polypropylenes, are crystallizable, i.e., under suitable conditions of solidification they obtain a high degree of crystallinity as determined by X-ray analysis or comparable methods. In general, polypropylene having a crystallinity of at least about 50% as measured by X-ray analysis, contains at most only a very small proportion of material which is extractable in boiling hydrocarbons, such as gasoline boiling range hydrocarbons. Typically the proportion of highly crystalline polypropylene which is extractable in boiling heptane or isooctane is less than 10% and usually less than 5%. Conventional crystalline polypropylene has a viscosity average molecular weight of at least about 40,000 and generally between 100,000 and 1,200,000. For convenience, the molecular weight is usually expressed in terms of intrinsic viscosity. The intrinsic viscosity of polypropylene, measured in Decalin at 150° C., is generally between 1.0 and 6 dl./g. but may be as low as 0.5 or less and as high as 10 or more.

The process of this invention leads to the production of polyalpha-olefins of high crystallinity.

Polypropylene produced with catalyst compositions according to this invention is characterized by a relatively high intrinsic viscosity, e.g., of the order of 7 dl./g., measured in Decalin. Intrinsic viscosities in the range from 1.5 to 8 dl./g. may be obtained, however, by utilizing molecular weight-modifying additives, such as hydrogen for molecular weight reduction, or by suitable changes in catalyst composition and reaction conditions.

Since the crystallinity of polypropylene produced according to this invention is higher than that of polypropylene produced with many conventional catalysts, the polymers of this invention have a higher tensile strength and greater stiffness. This improves their utility for numerous applications. In general, articles can be manufactured from these polymers by the same techniques utilized for polymers of somewhat lower crystallinity such as are conventionally produced; these techniques include blow molding, injection molding, extrusion, melt spinning, and the like.

For purposes of the present specification and claims, "aryl" is defined as a univalent hydrocarbon radical derived from an unsaturated aromatic hydrocarbon by removal of a hydrogen from a carbon atom of an aromatic nucleus, as, for example, phenyl$_R$ or naphthyl. "Alkaryl" radicals are corresponding radicals derived from alkyl-substituted aromatics, as, for example, tolyl, xylyl, and the like. "Aralkyl" radicals are alkyl radicals containing aryl substituent groups, as, for example, benzyl, tolylmethyl, and the like.

I claim as my invention:

1. A polymerization catalyst consisting essentially of an aluminum dihalide having the formula $RAlX_2$ wherein R is a hydrocarbon radical containing 1 to 12 carbon atoms, selected from the group consisting of alkyl, aryl, and aralkyl, and X is a halogen atom; a trivalent halide of titanium; and an acetylacetonate of a metal from the group consisting of manganese, chromium and iron, the molar ratio of said acetylacetonate to said aluminum dihalide being within the range of 0.1:1 to 1:1.

2. A polymerization catalyst consisting essentially of an alkyl aluminum dichloride wherein the alkyl radicals contain 1 to 12 carbon atoms, titanium trichloride and an acetylacetonate of a metal from the group consisting of manganese, chromium and iron, the molar ratio of said acetylacetonate to said alkyl aluminum dichloride being within the range of 0.1:1 to 1:1.

3. A polymerization catalyst consisting essentially of ethyl dichloride, gamma-titanium trichloride, and manganese acetylacetonate, the molar ratio of ethyl aluminum dichloride to titanium trichloride being from 1:05 to 1:2 and that of manganese acetylacetonate to ethyl aluminum dichloride being from 0.4:1 to 0.8:1.

4. The catalyst of claim 7 wherein said titanium trichloride is beta titanium trichloride.

5. The catalyst of claim 7 wherein said titanium trichloride is gamma titanium trichloride.

6. The catalyst of claim 7 wherein said titanium trichloride is delta titanium trichloride.

7. A polymerization catalyst consisting essentially of ethyl aluminum dichloride, titanium trichloride, and chromium acetylacetonate, the molar ratio of ethyl aluminum dichloride to titanium trichloride being from 1:0.5 to 1:2 and that of chromium acetylacetonate to ethyl aluminum dichloride being from 0.4:1 to 0.8:1.

8. In the polymerization of alpha-monoolefinic hydrocarbon material of 3 to 7 carbon atoms per molecule to form solid, crystallizable polymer, the improvement which comprises catalyzing the polymerization with a catalyst consisting essentially of an aluminum dihalide having the formula $RAlX_2$ wherein R is a hydrocarbon radical containing 1 to 12 carbon atoms and selected from the group consisting of alkyl, aryl, and aralkyl and X is a halogen atom, a trivalent halide of titanium, and an acetylacetonate of a metal from the group consisting of manganese, chromium and iron, the molar ratio of said acetylacetonate to said aluminum dihalide being within the range of 0.1:1 to 1:1.

9. In the polymerization of alpha-monoolefinic hydrocarbon material of 3 to 7 carbon atoms per molecule to form solid, crystallizable polymer, the improvement which comprises effecting the polymerization in liquid dispersion in hydrocarbon diluent and in the presence of a catalyst consisting essentially of an alkyl aluminum dichloride wherein the alkyl radicals contain 1 to 12 carbon atoms, titanium trichloride and an acetylacetonate of a metal from the group consisting of manganese, chromium and iron, the molar ratio of said acetylacetonate to said aluminum dihalide being within the range of 0.1:1 to 1:1.

10. The process according to claim 9 where said alpha-monoolefinic hydrocarbon material is selected from the group consisting of ethylene, propylene and mixtures thereof.

11. The process according to claim 9 where said alpha-monoolefinic hydrocarbon material is propylene.

12. In the polymerization of an olefinic material selected from the group consisting of ethylene, propylene, and mixtures thereof to form solid, crystallizable polymer, the improvement which comprises effecting the polymerization in liquid dispersion in hydrocarbon diluent and in the presence of a catalyst consisting essentially of ethyl aluminum dichloride, titanium trichloride, and chromium acetylacetonate, the molar ratio of ethyl aluminum dichloride to titanium trichloride being from 1:0.5 to 1:2 and that of chromium acetylacetonate to ethyl aluminum dichloride being from 0.4:1 to 0.8:1.

13. The process according to claim 12 wherein said olefinic material consists of propylene.

14. In the polymerization of an olefinic material selected from the group consisting of ethylene, propylene, and mixtures thereof to form solid, crystallizable polymer, the improvement which comprises effecting the polymerization in liquid dispersion in hydrocarbon diluent and in the presence of a catalyst consisting essentially of ethyl aluminum dichloride, titanium trichloride, and manganese acetylacetonate, the molar ratio of ethyl aluminum dichloride to titanium trichloride being from 1:0.5 to 1:2 and that of manganese acetylacetonate to ethyl aluminum dichloride being from 0.4:1 to 0.8:1.

15. The process according to claim 14 wherein said olefinic material consists of propylene.

References Cited

UNITED STATES PATENTS

| | | | |
|---|---|---|---|
| 3,081,287 | 3/1963 | Coover et al. | 260—94.9 |
| 2,996,459 | 8/1961 | Andersen et al. | 252—429 |
| 2,954,367 | 9/1960 | Vandenberg | 260—93.7 |
| 3,009,907 | 11/1961 | Mahlman | 260—94.9 |

FOREIGN PATENTS

| | | |
|---|---|---|
| 1,231,089 | 9/1960 | France. |
| 565,191 | 8/1958 | Belgium. |
| 875,924 | 8/1961 | Great Britain. |

OTHER REFERENCES

Highly Stereospecific Catalytic Systems for the Polymerization of α-Olefins to Isotactic Polymers, Natta et al., J. Polymer Science, SL, 387–398 (1961) (page 392 relied on).

JOSEPH L. SCHOFER, *Primary Examiner.*

M. B. KURTZMAN, *Assistant Examiner.*